United States Patent
Krause et al.

[11] 3,708,042
[45] Jan. 2, 1973

[54] CARBON CORE SEGMENTED FRICTION DISC

[75] Inventors: Walter J. Krause; Gilbert T. Stout, both of South Bend, Ind.

[73] Assignee: The Bendix Corporation

[22] Filed: Sept. 21, 1970

[21] Appl. No.: 74,054

[52] U.S. Cl..........188/73.2, 188/218 XL, 192/107 R
[51] Int. Cl................................................F16d 65/12
[58] Field of Search........188/73.2, 218 XL, 264 CE; 192/107 R

[56] References Cited

UNITED STATES PATENTS

| | | | |
|---|---|---|---|
| 3,237,731 | 3/1966 | Du Bois | 188/218 XL |
| 3,599,766 | 8/1971 | Ely et al. | 188/218 XL X |
| 3,403,759 | 10/1968 | Holcomb, Jr. | 188/218 XL |
| 2,835,367 | 5/1958 | Steck | 182/107 R |
| 3,456,768 | 7/1969 | Holcomb, Jr. | 192/107 R |

*Primary Examiner*—George E. A. Halvosa
*Attorney*—Plante, Hartz, Smith & Thompson and Gordon H. Chenez

[57] ABSTRACT

A friction disc for a disc brake having a plurality of interleaved brake rotor and stator discs which are forced together to provide a friction effect. The rotor is provided with a plurality of segments each of which includes a carbon block having friction material pads fixedly secured to opposite faces thereof. The segments are attached to a ring or strap which holds the segments in fixed spaced-apart relationship to define an annular rotor disc.

8 Claims, 5 Drawing Figures

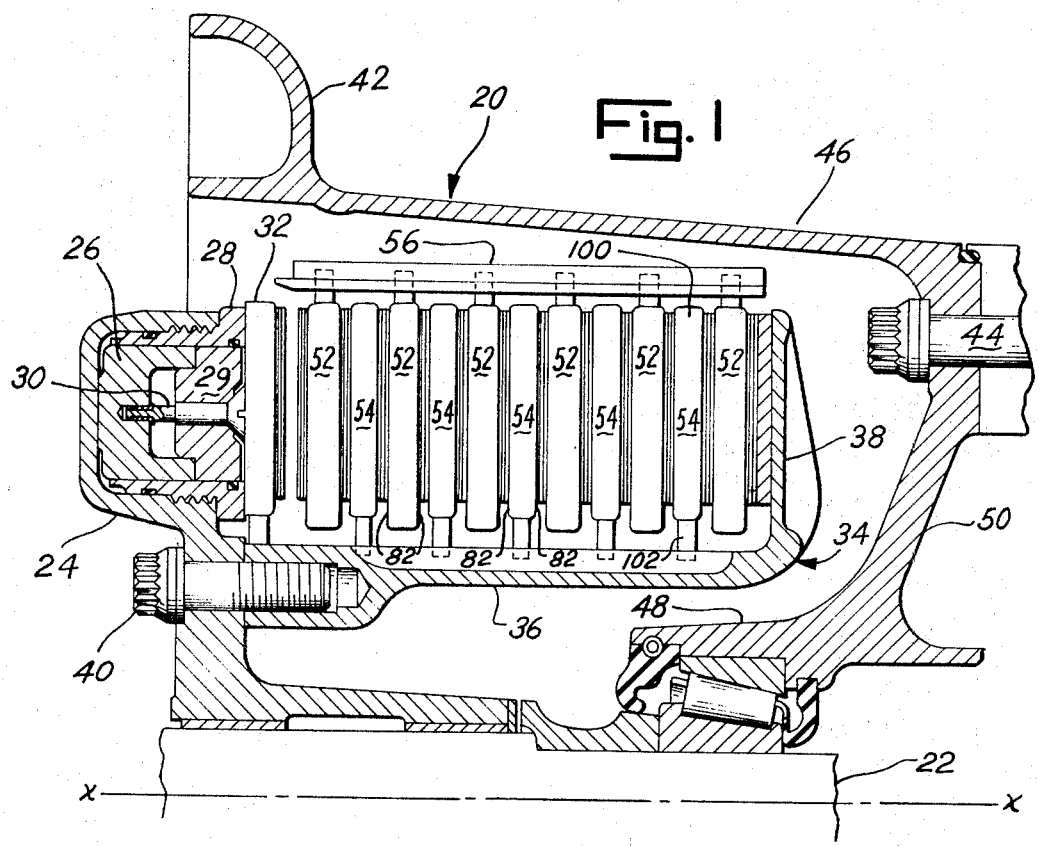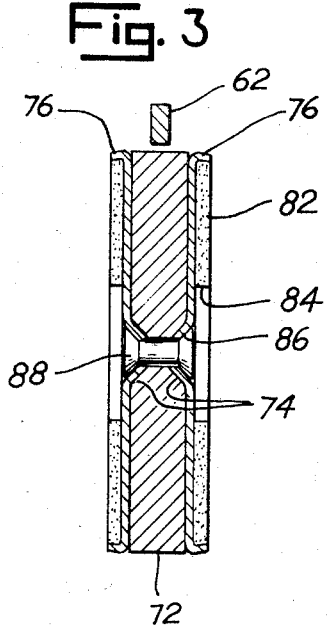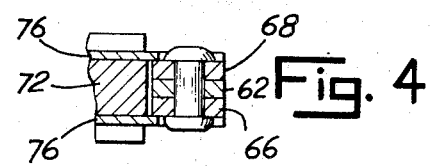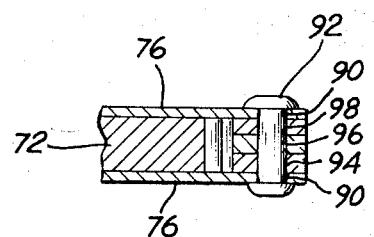

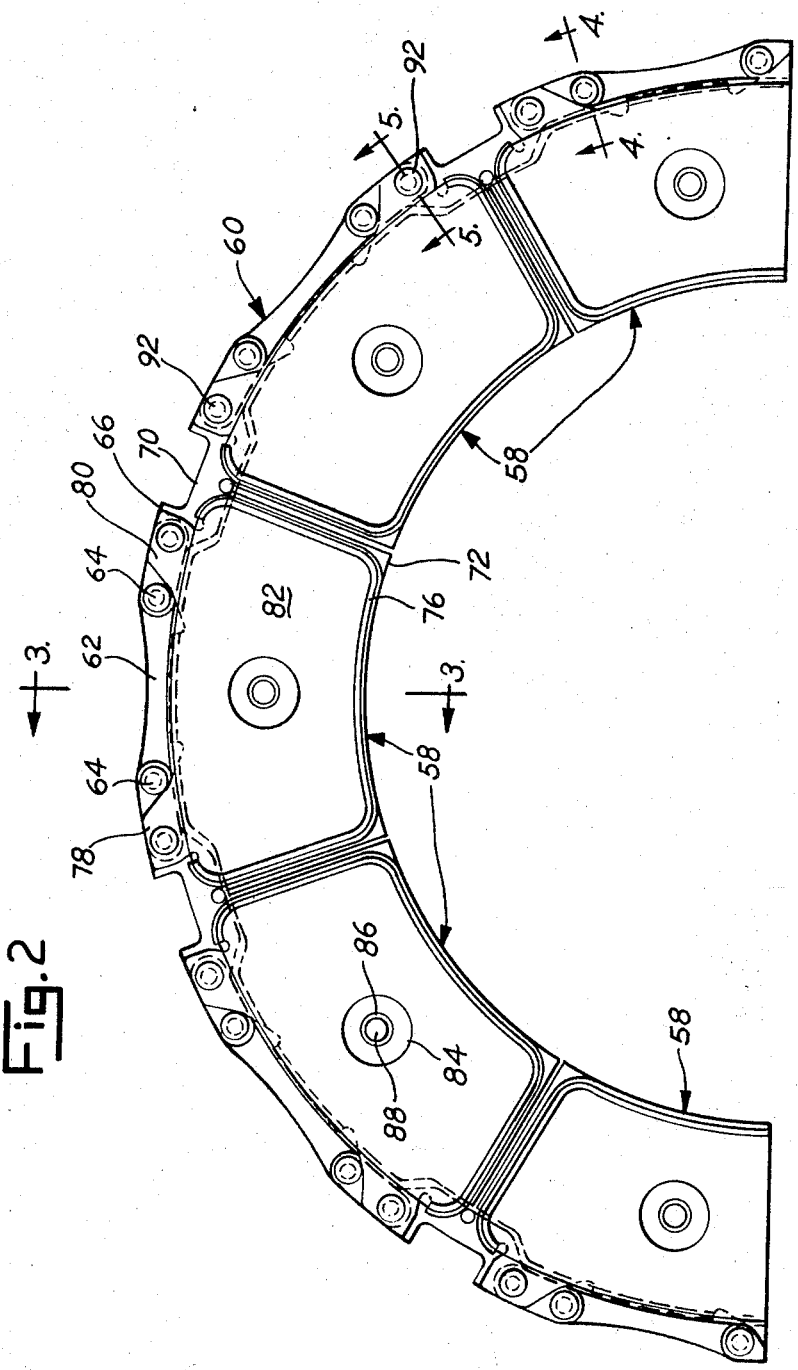

3,708,042

CARBON CORE SEGMENTED FRICTION DISC

BACKGROUND OF THE INVENTION

Disc brakes having a plurality of interleaved annular brake rotor and stator elements are well known particularly in the field of aircraft brakes as evidenced by U. S. Pat. No. 3,376,960 issued Apr. 9, 1968 and U.S. Pat. No. 3,473,635 issued July 7, 1959. Such prior art disc brakes teach a segmented rotor similar to that of the present invention to the extent of providing a plurality of segments each of which has a heat sink core defined by a material having the desirable characteristics of high specific heat, low density and high thermal conductivity. However, such segmented rotors utilizing heat sink core material are not entirely satisfactory for one or more reasons including structural limitations peculiar to the core material, deterioration of the core material into harmful oxide toxic to humans and core material expense.

SUMMARY OF THE INVENTION

It is an object of the present invention to provide a carbon core segmented rotor having the desirable characteristics of light weight, structural simplicity, high heat sink capacity and structural strength.

It is another object of the present invention to provide a carbon core segmented friction disc which is reliable in operation and relatively economical to manufacture by virtue of structural simplicity.

It is an important object of the present invention to provide a segmented rotor for a disc brake wherein the segments thereof are provided with a carbon block sandwiched between layers of friction material.

Other objects and advantages of the present invention will be apparent from the following description taken with the accompanying drawings.

BRIEF DESCRIPTION OF THE DRAWINGS

FIG. 1 represents a sectional view of a symmetrical wheel and brake assembly having an axis x-x and embodying the present invention.

FIG. 2 represents a plan view of a portion of an annular rotor embodying the present invention and shown removed from the wheel and brake assembly of FIG. 1.

FIG. 3 represents a sectional view taken on line 3—3 of FIG. 2.

FIG. 4 represents a sectional view taken on line 4—4 of FIG. 2.

FIG. 5 represents a sectional view taken on line 5—5 of FIG. 2.

DESCRIPTION OF THE PREFERRED EMBODIMENT

Referring to FIG. 1, in particular, numeral 20 designates a wheel rotatably mounted on a fixed axle 22 for rotation about axis $x—x$. A fixed brake carrier member 24 rigidly secured to axle 22 by any suitable fastening means, not shown, is adapted to house a plurality of circumferentially spaced apart, fluid actuated, brake applying pistons 26 only one of which is shown. The pistons 26 are slidably carried in cylinders 28 threadedly secured to carrier 24 each piston 26 being provided with a block of heat insulating material 29 fastened thereto via a screw member 30. The pistons 26 are actuated upon demand by pressurized fluid controlled by control means, not shown.

An annular pressure plate 32 suitably secured to pistons 26 is actuated axially in response to pressurization of pistons 26 to apply the brake. A torque tube 34 is provided with an axially extending sleeve portion 36 integral with a radially extending annular backing plate 38. A plurality of bolts 40 extend through carrier member 24 into threaded engagement with sleeve portion spaced to thereby fixedly secure the torque tube 34 to carrier member 24.

The wheel 20 is formed of two sections, only one of which 42 is shown, bolted together by a plurality of fastening means such as bolts 44. A wheel rim 46 and wheel hub 48 are connected via integral wheel spokes 50.

A plurality of annular brake rotors 52 are spaced apart axially by brake stators 54 interposed therebetween. The rotors 52 are slidably keyed for axial movement to a retaining member 56 which, in turn, is suitably secured to wheel rim 46 and rotated by wheel 20. The stators 54 are slidably keyed for axial movement to sleeve portion 36 which prevents rotational movement of stators 54.

The rotors 52 are provided with facings of friction material. The interleaved rotors 52 and stators 54 are compressed between pressure plate 32 and backing plate 38 in response to pressurization of pistons 26 thereby creating frictional engagement between the rotors 52 and stators 54 to retard rotation of wheel 20 relative to axle 22.

Referring to FIGS. 2, 3, 4 and 5, each of the rotors 52 is defined by a plurality of segments 58 arranged in circumferentially spaced apart relationship and retained in position by a ring 60 connected to the radially outermost portion thereof. The ring 60 is defined by flat links 62 connected at opposite ends by rivets 64 to a pair of space apart flat links 66 and 68 each of which are provided with a notch or recess 70 therein. The links 62 are connected to the links 66 and 68 in end-to-end fashion to thereby define continuous ring 60.

The segments 58 each include a core or block of carbon material 72 having a counter sunk opening 74 therethrough between opposite parallel flat surfaces thereof. A cup or lining button 76 having the general outline of the carbon block 72 and provided with spaced apart ears or lug portions 78 and 80 is adapted to retain a layer of sintered friction material 82 which may take any one of various known forms. Reference is made to commonly assigned U. S. Pat. No. 3,269,489 issued Aug. 30, 1966 to Douglas Roth and U. S. Pat. No. 2,784,105 issued Mar. 5, 1957 to Frances Stedman and Robert Pocock for examples of such cup 76 and friction material combination. A central opening 84 in the layer of friction material 82 and a dimpled opening 86 in cup 76 are aligned with counter sunk opening 74 in block 72 to permit fastening of a cup 76 to each of the flat surfaces of block 72 by a rivet 88 suitably upset to fixedly secure the same together. The ears 78 and 80 have openings 90 therein to permit fastening of the cups 76 and carbon block 72 secured thereto the outer ring 60 by rivets 92 which also pass through openings 94, 96 and 98 in links 66, 62 and 68, respectively. It will be noted that the ear 78 is attached to links 66, 62 and 68 between associated rivet 64 and notch 70 and the ear 80 is similarly attached to the adjacent set of links 66 and 68 at the opposite end of link 62 thereby defining a rigid arcuate section of rotor 52. The segments 58 defined above are attached in relatively closely spaced apart relationship to outer ring 60 resulting in structural rigidity of rotor 52 as well as substantially continuous annular faces of friction material 82 on opposite sides of the rotor 52.

The stators 54 may take the form of an annular steel ring 100 having suitably radially inwardly extending projections 102 slidably carried for axial movement by sleeve portion 36. The opposite sides of each stator 54 are provided with a continuous facing of friction material 82 suitably secured thereto as by brazing. It will be recognized that the stators 54 are not limited to the above-described structure but, like rotors 52, may be constructed with a carbon core to increase the heat sink capacity of the disc brake or, if desired, only the stator may be provided with a carbon core in which case the rotor 52 may be formed of steel or other suitable conventional material. However, in any event, it will be recognized that carbon is characteristically weak in strength under stress except for compression such that, as in the case of the above-described rotor 52, the force derived from a brake application and imposed on the rotor 52 as well as the stator 54 should be imposed on the carbon material in the form of compression only if premature deterioration and/or failure of the brake is to be avoided.

Assuming a brake application is underway, the pistons 26 are pressurized causing the pressure plate 32 to move axially and compress the interleaved rotors 52 and stators 54 between pressure plate 32 and backing plate 38 to create frictional resistance to rotation of the wheel 20. The energy thus generated is dissipated in the form of heat which must be absorbed by the brake assembly including the rotors 52 and stators 54 in particular. The brake temperatures attained during hard brake applications of heavy aircraft can become severe causing warping or buckling of the rotors 52 as well as stators 54, which, in turn, reduces the effectiveness of the brake and may result in brake malfunctioning.

In applicant's brake the heat generated is transmitted to the carbon blocks 72 which exhibits excellent heat capacity as well as thermal conductivity characteristics and can withstand temperatures in excess of that which steel or other metals normally used for rotors and/or stators can tolerate without failure. The quantity of heat absorbed by the carbon blocks 72 acting as heat sinks tends to reduce the heat burden imposed on the critical steel or other metal portions of the rotors and stators which, in turn, reduces the operating temperatures thereof.

It will be noted that the carbon blocks 72 are subject to compression by virtue of the position of the same between the friction cups or lining buttons 76. The torque load transmitted between the brake rotors 52 and the wheel 20 is carried by the ears or lugs 78 and 80 of the rotor segments 58 to the exclusion of carbon blocks 72. The ring 60 is characterized by the links 62, 66 and 68 connected by rivets 64 to minimize the volume of steel required thereby reducing weight of the rotor 52 accordingly with no adverse effect on the strength characteristics required of the rotor 52.

While the carbon material proposed for use in carbon blocks 72 is preferably conventional non-structural carbon, it is suggested that other known forms of carbon such as structural carbon, graphite, etc. may be suitable for use in forming applicant's blocks 72.

We claim:
1. A friction disc for a disc type brake, said friction disc comprising:
   a torque transmitting ring member defined by alternate arcuate first and second sections said first section being a flat metal link provided with a pair of arcuately spaced apart openings at each end thereof and said second section being two parallel spaced apart flat metal links each of which are provided with a pair of arcuately spaced apart openings at each end thereof;
   said first section having opposite ends thereof interposed between the adjacent ends of said alternate second sections with the respective openings thereof in alignment;
   first fastening means extending through one set of said aligned openings to fixedly secure said first and second sections together;
   a plurality of circumferentially spaced apart arcuate friction disc segments arranged end-to-end to form a substantially continuous annular friction member;
   said friction disc segments each having first and second cup members containing friction material fixedly secured thereto each of which cup members are provided with radially extending arcuately spaced first and second lug portions;
   a carbon block interposed between said first and second cup members for maintaining the same in spaced apart relationship;
   second fastening means extending through said first and second cup members and said carbon block for holding the same in fixed relative portions;
   said first lug portions of said first and second cup members being provided with openings therein for alignment with the remaining openings in one end of said first section and associated aligned openings of said second section;
   said second lug portions of said first and second cup members being provided with openings therein for alignment with the remaining openings in the opposite end of said first section and associated aligned openings of said second section; and
   third fastening means extending through said openings in said first and second lug portions and associated aligned openings of said first and second sections to fixedly secure said friction disc segment to said ring member and maintain said first and second sections in fixed relative positions.

2. A friction disc as claimed in claim 1. wherein:
   said first and second lug portions extend radially outwardly from said cup members into engagement with said ring member thereby positioning said cup members and attached carbon block radially inwardly from said ring member.

3. A friction disc as claimed in claim 1. wherein said disc brake is provided with at least one rotor member and wherein:
   said rotor member is defined by said friction disc.

4. A friction disc as claimed in claim 1. wherein:
   said second fastening means includes a rivet member extending through the center portion of said carbon block.

5. A friction disc as claimed in claim 1. wherein said disc brake is provided with at least one rotor member interposed between two stator members engageable with said rotor member and wherein:

said rotor member is defined by said friction disc;

said stator members being arranged concentric with said rotor member and each having an annular layer of friction material fixedly secured thereto; and actuating means operatively connected to said rotor and stator members for forcing the same into engagement to establish frictional engagement therebetween.

6. A friction disc as claimed in claim 5. wherein:

said carbon blocks are subjected to compression only in response to frictional engagement of said rotor and stator members.

7. A friction disc as claimed in claim 1 wherein the disc type brake is adapted for use with a rotatable wheel and wherein:

said two parallel spaced apart flat metal links are recessed at the radially outermost portion thereof to accommodate an axially extending drive key fixedly secured to said wheel.

8. A friction disc as claimed in claim 7 wherein:

said recessed radially outermost portion is in alignment with a radial line extending between adjacent friction disc segments.

* * * * *